(12) United States Patent
Gueneau et al.

(10) Patent No.: US 12,509,237 B2
(45) Date of Patent: Dec. 30, 2025

(54) FORWARD ENGINE MOUNT FOR A HALF OR FULL WRAPAROUND PYLON

(71) Applicant: Airbus Operations SAS, Toulouse (FR)

(72) Inventors: Germain Gueneau, Toulouse (FR); Marc De Nicola, Toulouse (FR); Fabrice Grimal, Toulouse (FR); Olivier Pautis, Toulouse (FR); Jérôme Colmagro, Toulouse (FR); Frédéric Journade, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 19/039,464

(22) Filed: Jan. 28, 2025

(65) Prior Publication Data
US 2025/0242932 A1     Jul. 31, 2025

Related U.S. Application Data

(60) Provisional application No. 63/626,160, filed on Jan. 29, 2024.

(51) Int. Cl.
*B64D 27/40* (2024.01)
(52) U.S. Cl.
CPC .................................. *B64D 27/40* (2024.01)
(58) Field of Classification Search
CPC .... B64D 27/40; B64D 27/402; B64D 27/404; B64D 27/406
See application file for complete search history.

(56) References Cited

U.S. PATENT DOCUMENTS

| | | | | |
|---|---|---|---|---|
| 7,740,200 B2 * | 6/2010 | Diochon | ............... | B64D 27/402 244/54 |
| 8,128,021 B2 * | 3/2012 | Suciu | .................... | B64D 27/404 244/54 |
| 8,727,269 B2 * | 5/2014 | Stuart | .................. | B64D 27/404 60/797 |
| 12,129,767 B1 * | 10/2024 | Sage | ........................ | F01D 25/28 |
| 12,214,891 B2 * | 2/2025 | Coleman | .................... | F02K 3/06 |

* cited by examiner

*Primary Examiner* — Brian M O'Hara
(74) *Attorney, Agent, or Firm* — Greer, Burns & Crain, Ltd.

(57) ABSTRACT

An engine mounting system comprising an engine with a center of thrust, a first engine mount having a longitudinal axis that intersects with the center of thrust, a second engine mount having a longitudinal axis that intersects with the center of thrust, the longitudinal axis of the first engine mount intersecting the longitudinal axis of the second engine mount at the center of thrust, wherein the engine includes a first connection point at a first point on the engine, the first engine mount to couple the first connection point to a pylon, a second connection point at a second point on the engine, the second engine mount to couple the second connection point to the pylon, and a third connection point at a third point on the engine symmetrical to the second point across a centerline, the second engine mount to couple the third connection point to the pylon.

10 Claims, 6 Drawing Sheets

FORWARD ENGINE MOUNT FOR A HALF OR FULL WRAPAROUND PYLON

CROSS-REFERENCES TO RELATED APPLICATIONS

This application claims the benefit of the U.S. provisional patent application No. 63/626,160 filed on Jan. 29, 2024, the entire disclosure of which is incorporated herein by way of reference.

FIELD OF THE INVENTION

The invention relates to an engine for an aircraft, and more particularly to an engine mount for connecting the engine to a pylon or mast.

BACKGROUND OF THE INVENTION

In conventional engine mounting systems connecting an engine to a pylon (e.g., a propulsion assembly), certain engine mounts are arranged to distribute loads to the pylon from the center of gravity. With larger engines producing larger loads, this arrangement can cause undesired stresses on the conventional engine mounting systems and cause the engine to dip or move closer to the ground under load which could cause a propeller ground strike.

These large-diameter fan engines are heavily loaded due to the aerodynamic pressures applied to the plane of the rotating element (delta of pressure fields between "rising blade vs. falling blade" a function of incidence (e.g., Angle of Attack (AoA)) and aircraft forward speed).

Without proper load distribution management, increasing the diameter of engines and propellers without modifying the underlying aircraft structure can cause ground strikes of the propeller blades (e.g., the tips of the propeller blade contacting the ground) in conventional systems that do not manage these loads appropriately.

Especially in the case of propeller engines (e.g., internal combustion engines, turboprops, etc.), aerodynamic forces of the rotating element are applied substantially in front of the engine center of gravity and the compressor stages of the turbomachine. As the engines increase in size, thus also increasing a diameter of the propeller, ground strikes are more likely to occur without improving mounting structures.

Additionally, bolstering mounting structures cannot be placed anywhere on turbomachines such as turboprops. These mounting structures should be placed in locations where the engine can support/withstand these additional loads.

The present invention provides a physically integrated solution, via a system of fasteners, to provide the functions of force transfer and assembly between the mast and the engine, for a turboprop engine or other engine variants, with a large-diameter propeller or fan generating the main thrust component, to reduce displacement due to torsional and bending moments created by the turbomachine.

SUMMARY OF THE INVENTION

An object of the present propulsion assembly and engine mounting system is to provide such a system where the multiple linkage elements converge at the propeller/fan loads application point or center of thrust where aerodynamic forces are applied via the rotating element (propeller or fan). This distributes/routes propeller/fan loads directly in the pylon structure, and the torsional and bending moments are reduced in the case of aerodynamic loads applied to the rotating element. With this type of arrangement, the turbomachine operates more efficiently thanks to better management/consumption of ground clearance management/consumption.

To that end, there is a proposed engine mounting system for an aircraft, the engine mounting system comprising:
an engine having a propeller with a center of thrust; a pylon at least partially surrounding the engine to couple the engine to the aircraft, the pylon having a rigid structure having a frontal wall and a lower wall;
a first engine mount coupled to the pylon and the engine, the first engine mount having a longitudinal axis that intersects with the center of thrust, the first engine mount lying on an X-Z plane;
a second engine mount coupled to the pylon and the engine, the second engine mount having a longitudinal axis that intersects with the center of thrust, the second engine mount oriented below the first engine mount, the second engine mount including at least two shackle connectors arranged on opposite sides of the engine, the longitudinal axis of the first engine mount intersecting the longitudinal axis of the second engine mount at the center of thrust; and
a third engine mount coupled to the pylon and the engine aft of the first engine mount and the second engine mount, the third engine mount lying on a Y-Z plane;
wherein the pylon extends radially around the engine at least 180-degrees; and
wherein the engine includes:
a first connection point at a first point on the engine, the first engine mount to couple the first connection point to the pylon;
a second connection point at a second point on the engine, one of the at least two shackle connectors of the second engine mount to couple the second connection point to the pylon; and
a third connection point at a third point on the engine symmetrical to the second point across a centerline of the engine on opposite sides of the engine, one of the at least two shackle connectors of the second engine mount to couple the third connection point to the pylon.

According to a particular embodiment, the first engine mount further includes a two-point shackle coupled to the frontal wall of the pylon.

According to a particular embodiment, the second engine mount includes a two-point shackle coupling the first connection point to the pylon, the second connection point to the pylon, and the third connection point to the pylon respectively.

According to a particular embodiment, the third engine mount further includes a two-point shackle and a three-point shackle coupled to the lower wall of the pylon.

According to a particular embodiment, the propulsion assembly is configured to provide two degrees-of-freedom attributable to the first engine mount in Y-Z directions and two degrees-of-freedom attributable to the second engine mount in X-Y directions.

According to a particular embodiment, the first connection point is oriented 0-degrees from a vertical axis of the engine about a longitudinal axis of the engine.

According to a particular embodiment, the second connection point is oriented 90-degrees counter-clockwise about the longitudinal axis from the vertical axis and wherein the third connection point is oriented 90-degrees clockwise about the longitudinal axis from the vertical axis.

According to a particular embodiment, the second connection point is oriented at least 130-degrees counter-clockwise about the longitudinal axis from the vertical axis and wherein the third connection point is oriented at least 130-degrees clockwise about the longitudinal axis from the vertical axis.

According to a particular embodiment, the pylon extends radially around the engine at least 360-degrees.

The invention also proposes an aircraft comprising a fuselage, a wing attached to the fuselage, and the propulsion assembly according to one of the preceding variants attached to an underside of the wing via the rigid structure.

DETAILED DESCRIPTION OF THE DRAWINGS

Embodiments of the invention are described in more detail with reference to the accompanying schematic drawings that are listed below.

In general, the same reference numbers will be used throughout the drawing(s) and accompanying written description to refer to the same or like parts.

DETAILED DESCRIPTION OF THE PREFERRED EMBODIMENTS

Figure 1:
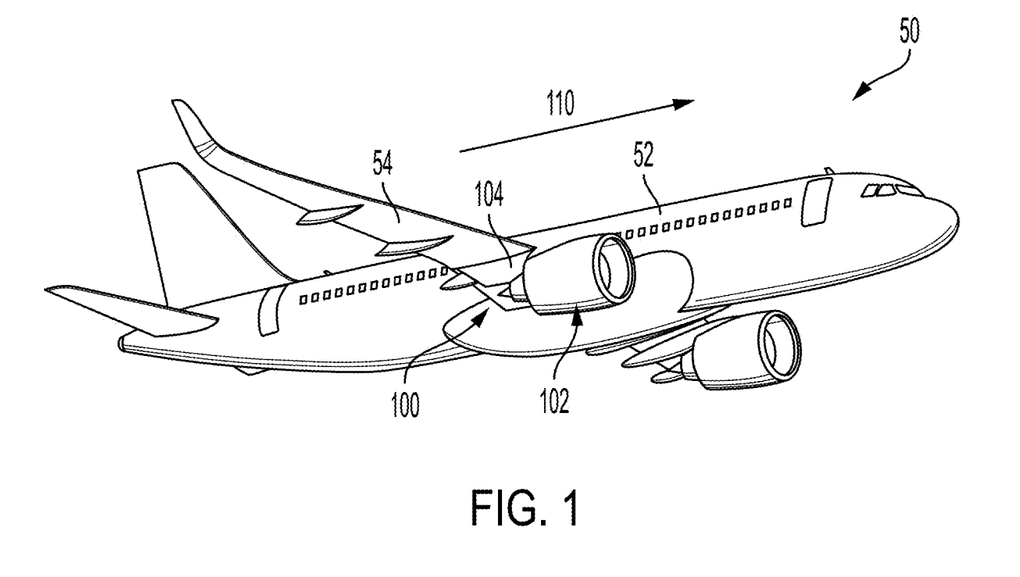
FIG. 1 shows a perspective view of an aircraft according to the present invention.

FIG. 1 shows an aircraft 50 that has a fuselage 52 and a wing 54 attached to the fuselage 52 beneath which a propulsion assembly 100 according to the invention is mounted that has an engine 102, in this case housed by an attachment pylon 104. In the examples disclosed herein, the engine 102 is a turboprop engine including a propeller that is mechanically driven by a turbine engine by a shaft (not shown). However, the present disclosure is applicable to other types of engines requiring a mounting system according to the examples disclosed herein.

By convention, X denotes a longitudinal axis of the engine 102, this axis X being parallel to a longitudinal direction of this engine 102. X also denotes a centerline of the engine 102. Moreover, Y denotes a transverse axis of the engine 102, this axis being horizontal when the aircraft 50 is on the ground, and Z denotes a vertical axis or vertical height when the aircraft 50 is on the ground, these three axes X, Y and Z being mutually orthogonal (shown in FIGS. 2-7).

Moreover, the terms "front" and "rear" are to be considered relative to a direction of forward movement of the aircraft 50 when the engine 102 is in operation, this direction being schematically shown by the arrow 110.

The attachment pylon 104 is roughly symmetrical with respect to a vertical median plane XZ of the engine 102, the plane passing through the longitudinal axis X of the engine 102 and being referred to hereinafter as median plane.

Figure 2:
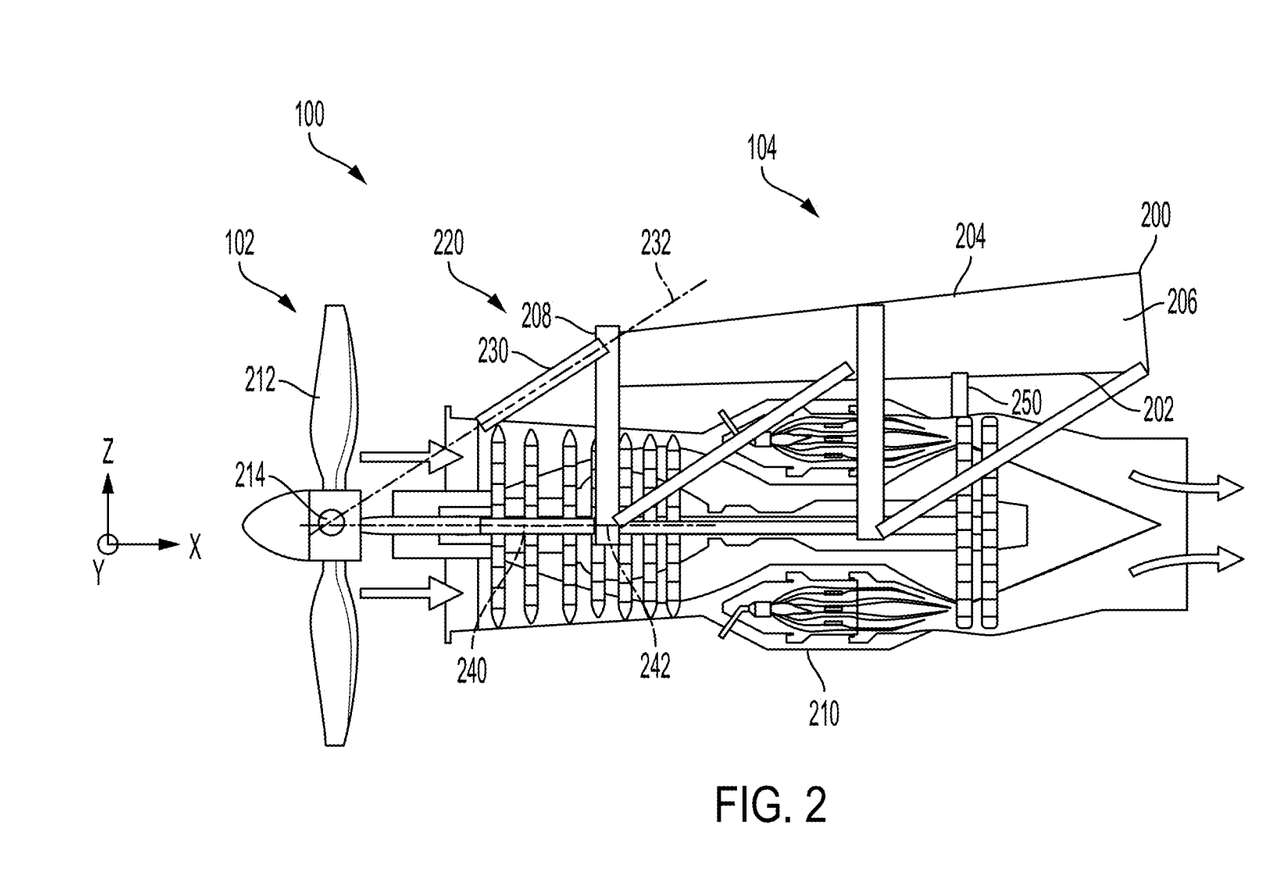
FIG. 2 is a side view of a propulsion assembly for a half wraparound pylon.

FIG. 2 is a side view of the propulsion assembly 100 that has the engine 102 and the attachment pylon 104 via which the engine 102 is fastened to the wing 54 (not shown in FIG. 2). The attachment pylon 104 is shown here by a rigid structure 200, which is also referred to as the primary structure. The rigid structure 200 extends along the longitudinal axis X between a front end and a rear end, between which there is a median zone.

In the example of FIG. 2, the rigid structure 200 takes the form of a polyhedron (or other shape of the like) that has a lower wall 202, an upper wall 204, two lateral walls 206 on either side of the median plane and a frontal wall 208 oriented towards the front. The rigid structure 200 is fastened to the wing 54 via means known to those skilled in the art.

The engine 102 includes a core section 210 and a propeller 212. The core section 210 includes the turbine engine which drives a shaft mechanically coupled to the propeller 212 to turn the propeller 212 and provide thrust. The engine 102 has a center of thrust 214 acting along the longitudinal X axis corresponding to a point in which the thrust load created by the engine 102 can be represented. The center of thrust 214 is also the point in which aerodynamic loads applied to the propeller blades can be represented.

In the example of FIG. 2, the propulsion assembly 100 includes an engine mounting system 220 for coupling the engine 102 to the rigid structure 200. The engine mounting system 220 includes a first engine mount 230 disposed at an upper region of the engine 102. The first engine mount 230 has a longitudinal axis 232 extending along a plane in which the first engine mount 230 lies and intersects at the center of thrust 214 of the engine 102. In the example of FIG. 2, the first engine mount 230 lies on the X-Z plane and couples a first connection point of the engine 102 to the rigid structure 200 at the frontal wall 208.

The engine mounting system 220 further includes a second engine mount 240 disposed at a transverse (e.g., a side) region of the engine 102. The second engine mount 240 has a longitudinal axis 242 extending along a plane in which the second engine mount 240 lies and intersects at the center of thrust 214 of the engine 102. In the example of FIG. 2, the second engine mount 240 lies on the X-Y plane and couples a second connection point of the engine 102 to the rigid structure 200 at the frontal wall 208. The longitudinal axis 232 of the first engine mount 230 intersects the longitudinal axis 242 of the second engine mount 240 at the center of thrust 214. Such an arrangement reduces displacement due to torsional and bending moments caused by operation of the engine 102 by directing thrust loads directly to the rigid structure 200.

In some examples, the second engine mount 240 is symmetrical about the longitudinal X axis of the engine 102 such that the second engine mount 240 couples a third connection point of the engine 102 to the rigid structure 200 at the frontal wall 208.

In the example of FIG. 2, the engine mounting system 220 further includes a third engine mount 250 disposed at a rear portion of the engine mounting system 220, aft of the first engine mount 230 and the second engine mount 240. The third engine mount 250 couples the engine 102 to a lower wall 202 of the rigid structure 200. The third engine mount 250 is oriented to transfer inertial forces from the core section 210 to the rigid structure 200. In the examples disclosed herein, the third engine mount 250 includes two shackle connectors, each symmetrically disposed on either side of the centerline of the engine 102. One of the shackle connectors is a two-point shackle connector and the other is a three-point shackle connector (shown with respect to FIG. 7).

An advantage of the present solution is that it is possible to retain an aft engine mount in the turbine area (e.g., the third engine mount 250 in the core section 210), which is important for overall stability (e.g., for inertial loading of the core area, dynamic stability, etc.) and safety (e.g., sensitivity to engine bursts), while limiting torsional and bending moments, which has an impact on ground clearance management.

In some examples, redundancy is desired to prevent undesired consequences due to failure of components within the engine mounting system 220. As such, the first engine mount 230 and the second engine mount 240 both includes redundant two-point shackles (e.g., each connection of the engine 102 to the rigid structure 200 includes two two-point shackles, also shown with reference to FIG. 6). Including two shackles per connection allows for greater redundancy protection in the event that the first engine mount 230 or the second engine mount 240 were to fail during operation of the engine 102.

Also as shown in FIG. 2, the first engine mount 230 and the second engine mount 240 are positioned closer toward the propeller 212, where the aerodynamic forces originate. Such an arrangement reduces torsional and bending moments by reducing a distance in which the aerodynamic forces act on accompanying structures.

Figure 3:
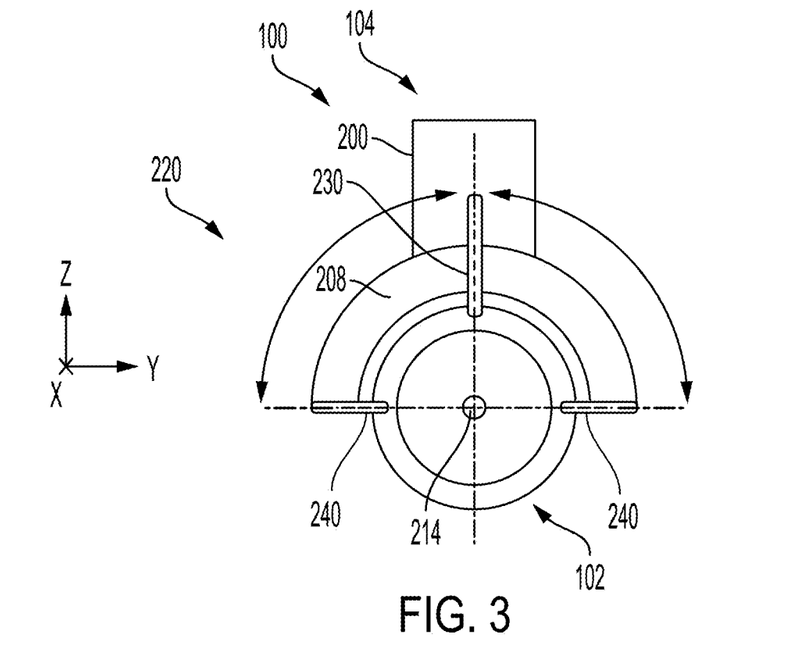
FIG. 3 is a front view of the propulsion assembly of FIG. 2.

FIG. 3 is a front view of the propulsion assembly 100 of FIG. 2, omitting the propeller 212. As shown in FIG. 3, the rigid structure 200 of the pylon 104 wraps around the engine 102 at least 180-degrees.

In the example of FIG. 3, the first engine mount 230 is oriented 0-degrees from the vertical Z axis. Also shown in FIG. 3, the second engine mount 240 is oriented at two points, one point being substantially 90-degrees counterclockwise about the longitudinal axis from the vertical Y axis, and the other point being substantially 90-degrees clockwise about the longitudinal axis from the vertical Y axis. In some examples, the degree of rotation about the longitudinal axis can be 90-degrees plus or minus roughly 25-degrees up to the limits provided by the rigid structure 200.

Figure 4:
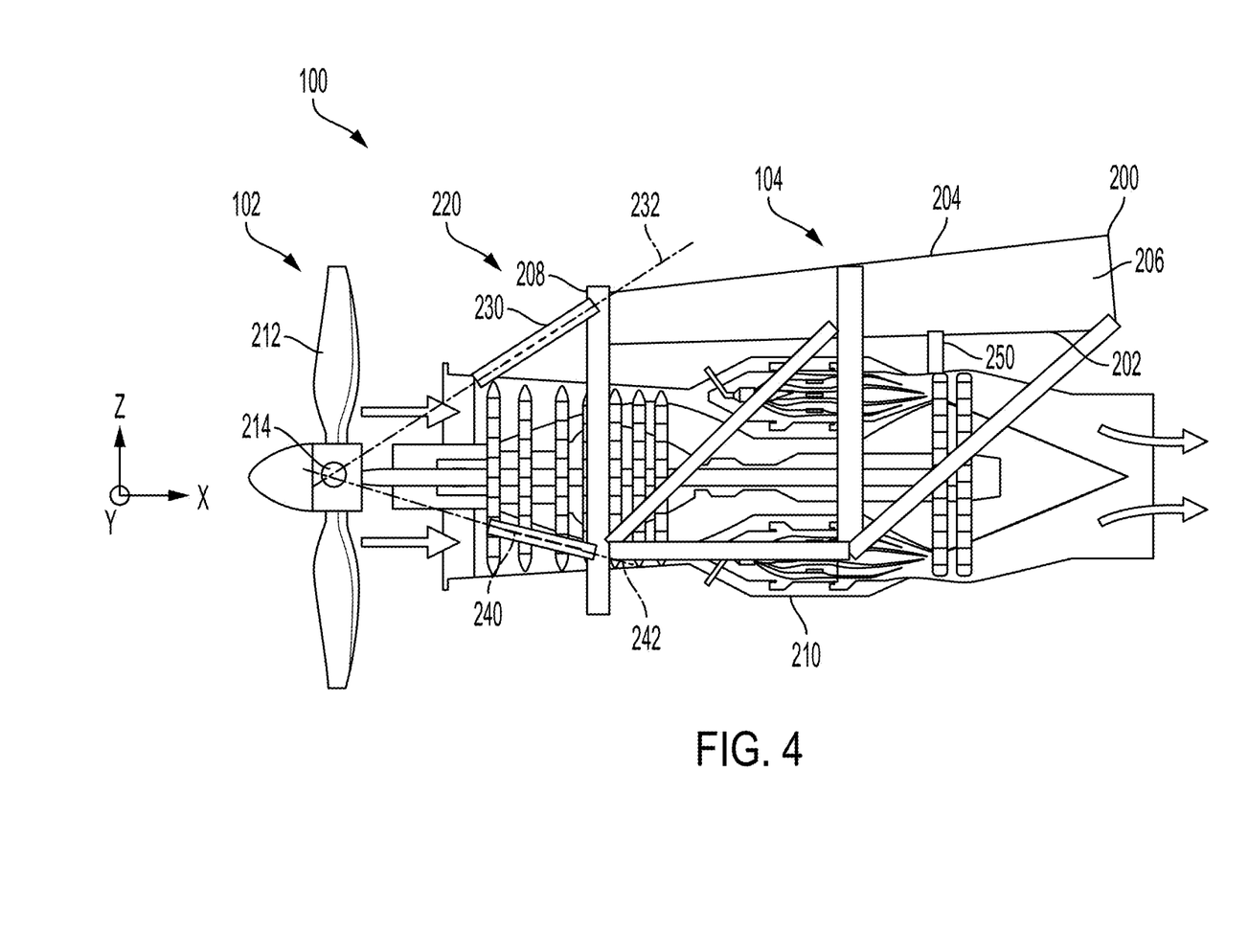
FIG. 4 is a side view of a propulsion assembly for a full wraparound pylon.

FIG. 4 is a side view of the propulsion assembly 100 adapted for a full wraparound pylon (e.g., 360-degrees). In some examples, such as those shown in FIG. 4, the rigid structure 200 of the pylon 104 wraps around the engine 102 such that the rigid structure 200 fully encases at least the core section 210 of the engine 102. Such examples can be due to existing structural mechanisms, space requirements around the core section 210, structural requirements due to the thrust produced by the engine 102, etc.

The same features have the same reference numbers throughout, and the discussion regarding such is incorporated herein by reference. As such, the first engine mount 230 in the example of FIG. 4 is unchanged from the examples of FIGS. 2-3. The second engine mount 240 is oriented at an angle below that of the example of FIGS. 2-3 to account for an increase in volume of the rigid structure 200 disposed beneath the second engine mount 240. The longitudinal axis 242 of the second engine mount 240 intersects the center of thrust 214 and also intersects the longitudinal axis 232 of the first engine mount 230 at the center of thrust 214.

Figure 5:
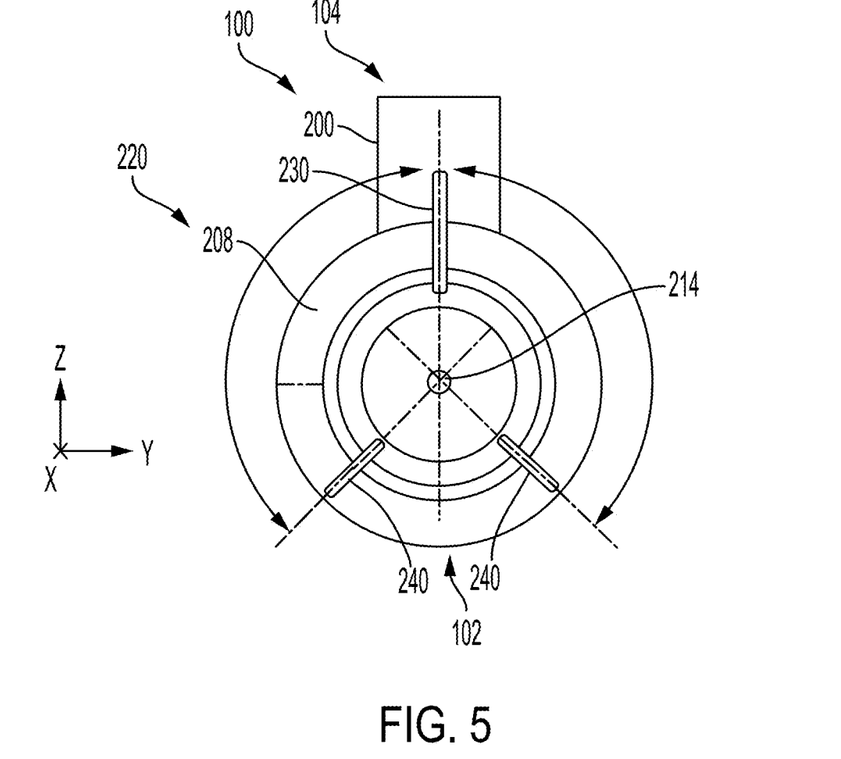
FIG. 5 is a front view of the propulsion assembly of FIG. 5.

FIG. 5 is a front view of the propulsion assembly 100 of FIG. 4, omitting the propeller 212. As shown in FIG. 5, the rigid structure 200 of the pylon 104 wraps around the engine 102 at least 360-degrees.

In the example of FIG. 5, the first engine mount 230 is oriented 0-degrees from the vertical Z axis. Also shown in FIG. 5, the second engine mount 240 is oriented at two points, one point being substantially 130-degrees counterclockwise about the longitudinal axis from the vertical Y axis, and the other point being substantially 130-degrees clockwise about the longitudinal X axis from the vertical Y axis. In some examples, the degree of rotation about the longitudinal axis can be 130-degrees plus or minus roughly 25-degrees up to the limits provided by the rigid structure 200.

In the examples disclosed herein according to FIGS. 2-5, the engine mounting system 220 is a statically determinate six degrees-of-freedom system including one degree of freedom attributable to the first engine mount 230, two degrees of freedom attributable to the second engine mount 240 (e.g., one degree of freedom per instance of the second engine mount 240), and three degrees of freedom attributable to the third engine mount 250.

The first engine mount 230 distributes aerodynamic loads in the longitudinal X axis and the vertical Z axis. The second engine mount 240 distributes aerodynamic loads in the longitudinal X axis and the transverse Y axis. The third engine mount 250 distributes aerodynamic loads in the transverse Y axis and in the vertical Z axis. Additionally, since the third engine mount 250 is not arranged to direct the loads produced by the engine 102 from the center of thrust 214, the third engine mount 250 also distributes Mx, then My and Mz moment loads created by the engine 102 by the coupling with forward interfaces planes created by the first engine mount 230 and the second engine mount 240, where the second engine mount 240 is distributed on opposite sides of the engine 102 according to the examples disclosed herein. Thus, the engine mounting system 220 includes six degrees-of-freedom, three translational degrees of freedom in the X, Y, and Z axes, and three rotational moment degrees of freedom in the Mx, My, and Mz moments.

Figure 6:
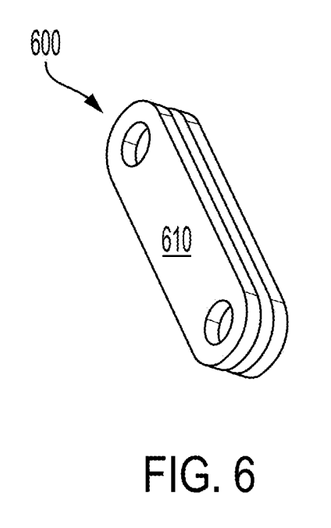
FIG. 6 is an example two-point shackle arrangement for the propulsion assembly of FIGS. 2-5.

FIG. 6 is an example two-point shackle arrangement 600 for the propulsion assembly 100 of FIGS. 2-5. In the example of FIG. 6 and as discussed herein, the two-point shackle arrangement 600 is used for the first engine mount 230 and the second engine mount 240. Also as shown in FIG. 6, the two-point shackle arrangement 600 includes two two-point shackles 610 for each of the first engine mount 230 and the second engine mount 240 for redundancy. In some examples, such redundancy is desired as discussed herein.

Figure 7:
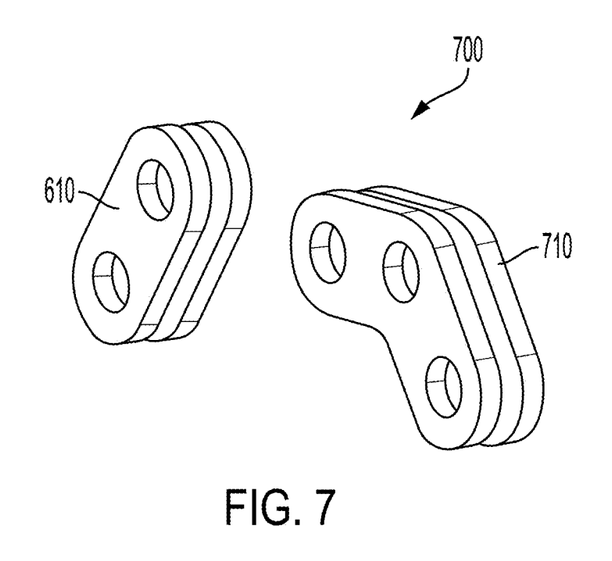
FIG. 7 is an example two-point and three-point shackle arrangement for one of the engine mounts according to the propulsion assembly of FIGS. 2-5.

FIG. 7 is an alternate shackle arrangement 700 including a two-point shackle 610 and a three-point shackle 710 for the propulsion assembly 100 of FIGS. 2-5. In the example of FIG. 7 and as discussed herein, the alternate shackle arrangement 700 is used for the third engine mount 250. Also as shown in FIG. 7, the two-point shackle arrangement includes two of each the two-point shackle 610 and the three-point shackle 710 for the third engine mount 250. In some examples, such redundancy is desired as discussed herein.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A propulsion assembly for an aircraft, the propulsion assembly comprising:
    an engine having a propeller with a center of thrust;
    a pylon at least partially surrounding the engine to couple the engine to the aircraft, the pylon having a rigid structure having a frontal wall and a lower wall;
    a first engine mount coupled to the pylon and the engine, the first engine mount having a longitudinal axis that intersects with the center of thrust, the first engine mount lying on an X-Z plane;
    a second engine mount coupled to the pylon and the engine, the second engine mount having a longitudinal axis that intersects with the center of thrust, the second engine mount oriented below the first engine mount, the second engine mount including at least two shackle connectors arranged on opposite sides of the engine, the longitudinal axis of the first engine mount intersecting the longitudinal axis of the second engine mount at the center of thrust; and
    a third engine mount coupled to the pylon and the engine aft of the first engine mount and the second engine mount, the third engine mount lying on a Y-Z plane;
    wherein the pylon extends radially around the engine at least 180-degrees;
    wherein the engine includes:
        a first connection point at a first point on the engine, the first engine mount to couple the first connection point to the pylon;
        a second connection point at a second point on the engine, one of the at least two shackle connectors of the second engine mount to couple the second connection point to the pylon; and
        a third connection point at a third point on the engine symmetrical to the second point across a centerline of the engine on opposite sides of the engine, one of the at least two shackle connectors of the second engine mount to couple the third connection point to the pylon.

2. The propulsion assembly of claim 1, wherein the first engine mount further includes a two-point shackle coupled to the frontal wall of the pylon.

3. The propulsion assembly of claim 1, wherein the second engine mount includes a two-point shackle coupling the first connection point to the pylon, the second connection point to the pylon, and the third connection point to the pylon respectively.

4. The propulsion assembly of claim 1, wherein the third engine mount further includes a two-point shackle and a three-point shackle coupled to the lower wall of the pylon.

5. The propulsion assembly of claim 1, wherein the propulsion assembly is configured to provide two degrees-of-freedom attributable to the first engine mount in Y-Z directions and two degrees-of-freedom attributable to the second engine mount in X-Y directions.

6. The propulsion assembly of claim 1, wherein the first connection point is oriented 0-degrees from a vertical axis of the engine about a longitudinal axis of the engine.

7. The propulsion assembly of claim 6, wherein the second connection point is oriented 90-degrees counter-clockwise about the longitudinal axis from the vertical axis and wherein the third connection point is oriented 90-degrees clockwise about the longitudinal axis from the vertical axis.

8. The propulsion assembly of claim 6, wherein the second connection point is oriented at least 130-degrees counter-clockwise about the longitudinal axis from the vertical axis and wherein the third connection point is oriented at least 130-degrees clockwise about the longitudinal axis from the vertical axis.

9. The propulsion assembly of claim 1, wherein the pylon extends radially around the engine at least 360-degrees.

10. An aircraft comprising:
    a fuselage;
    a wing attached to the fuselage; and
    the propulsion assembly according to claim 1 attached to an underside of the wing via the rigid structure.

* * * * *